United States Patent

Goetchius et al.

[15] 3,676,602

[45] July 11, 1972

[54] TELEPHONE SET IDENTIFICATION SYSTEM

[72] Inventors: Norman E. Goetchius; Amin Y. Zaky, both of Rochester, N.Y.

[73] Assignee: Stromberg-Carlson Corporation, Rochester, N.Y.

[22] Filed: Oct. 26, 1970

[21] Appl. No.: 83,699

[52] U.S. Cl. ........................................179/17 A, 179/84 VF

[51] Int. Cl. ........................................H04m 1/50

[58] Field of Search........179/17 A, 18 FA, 84 VF, 175.31 R, 179/175.2 R

[56] References Cited

UNITED STATES PATENTS

| | | | |
|---|---|---|---|
| 3,551,610 | 12/1970 | Pichot | 179/175.31 R |
| 2,820,100 | 1/1958 | Abbott | 179/17 A |
| 2,908,762 | 10/1959 | Meacham | 179/17 A |
| 3,184,554 | 5/1965 | Meacham et al. | 179/84 VF |

*Primary Examiner*—Kathleen H. Claffy
*Assistant Examiner*—William A. Helvestine
*Attorney*—Charles C. Krawczyk

[57] ABSTRACT

A telephone set identification system wherein telephones are equipped with circuits that are responsive to a high potential signal from the central office (when the telephone is off hook) to generate and transmit a preselected identification signal to the central office.

11 Claims, 6 Drawing Figures

NORMAN E. GOETCHIUS
AMIN Y. ZAKY
INVENTOR.

BY Charles C. Krawczyk
Ann C. Williams
ATTORNEYS

NORMAN E. GOETCHIUS
AMIN Y. ZAKY
INVENTOR.

BY Charles C. Krawczyk
Ann C. Williams
ATTORNEYS

NORMAN E. GOETCHIUS
AMIN Y. ZAKY
INVENTOR.

BY Charles C Krawczyk
Ann C. Williams
ATTORNEY

NORMAN E. GOETCHIUS
AMIN Y. ZAKY
INVENTOR.

BY Charles C. Krawczyk
Ann C. Williams
ATTORNEY

NORMAN E. GOETCHIUS
AMIN Y. ZAKY

INVENTOR.

BY Charles C. Krawczyk
Ann C. Williams

ATTORNEYS

TELEPHONE SET IDENTIFICATION SYSTEM

BACKGROUND OF THE INVENTION

This invention pertains to telephone signalling systems in general, and more particularly to telephone systems for identifying individual telephone sets.

The trend in modern telephone systems is toward providing the telephone subscriber with new types of automatic services, such as direct distance dialing (DDD) and automatic toll ticketing. The progress of automation has been rather rapid for private line subscribers. However, in the case of multiparty subscriber lines progress has not been as rapid. One of the principal problems involved in providing automatic services to party line subscribers has been the absence of a suitable means for automatically identifying the separate subscriber telephone sets connected to a common telephone line.

In party lines with two subscribers, an identification means was provided in the prior art by a ground connection to a center tap in the ringer circuit of one telephone set on the party line. However, in the case of party lines having more than two parties, the calling party in the prior art is generally required to identify himself by dialing an extra digit (circle digit dialing) or by oral communications to an operator. A party identification on multiparty lines is described in U.S. Pat. No. 2,824,173, issued on Feb. 18, 1958, to L.A. Meacham, entitled "Transistor Selective Ringing, Dialing and Party Identification Circuit". In this system a party identification signal is automatically generated when the subscriber dials the multifrequency telephone set. With this arrangement, a damped oscillatory identification signal is transmitted along with each of the multifrequency dial signals. Other arrangements in the prior art included special electromechanical devices in the telephone set to provide a coded series of pulses to the central office when the handset is removed from the cradle.

The multiparty identification systems of the prior art generally require an activity on the part of the subscriber to provide the means of identifying the calling party. However, there are instances when party identification without any subscriber participation is highly desirable. For example, it is desirable to identify sources of problems in a multiparty line, such as that experienced in a case wherein one telephone set on the party line is inadvertently left off hook and wherein the "off hook" telephone prevents any telephone service to all the other subscribers on the same party line. In the prior art, the telephone company was required to contact each of the subscribers in a step-by-step process to determine the condition of each of the telephone sets connected to the party line. This arrangement is time consuming and expensive, and a great inconvenience to the other telephone subscribers connected on the party line.

The identification system of the present invention provides means for automatically identifying a telephone in an off hook condition. This improved telephone identification system can be accomplished by a simple modification to well known circuit elements in existing telephone sets and central office equipment in accordance with the instant invention as set forth below. The identification system of the invention can be used for identifying various telephone lines and/or for identifying any one of a plurality of party telephones connected to a single telephone line.

In a copending patent application entitled "Telephone Set Identification System Using Reverse Polarity Interrogation Signal", Ser. No. 83,700, for Norman E. Goetchius and Amin Y. Zaky on Oct. 26, 1970, and discloses an identification system wherein a reverse polarity interrogation signal is transmitted from the central office to actuate a signalling means in an off hook telephone.

Accordingly, it is an object of this invention to provide a new and improved means for identifying individual telephone sets.

It is also an object of this invention to provide a new and improved means for identifying individual telephone sets connected to a multiparty line.

It is also an object of this invention to provide a new and improved means for automatically identifying a telephone set connected on a multiparty telephone line.

It is also an object of the invention to provide a new and improved means for party identification which utilizes a well known circuit modified in accordance with the invention and which can easily be connected into existing telephone systems.

BRIEF DESCRIPTION OF THE INVENTION

The identification system includes a signal generating means connected to telephone sets so that the signal generating means generates an identification signal (when off hook) in response to an identification request or interrogation signal from the central office of a substantially higher than normal battery potential. The identification signal is transmitted over the telephone lines and detected at the central office.

In accordance with one embodiment of the invention, the standard multifrequency oscillator of pushbutton telephones of the prior art is modified so that with normal battery potential applied to the telephone line, the oscillator will only operate by depressing a pushbutton switch in the dial, and with a substantially higher potential applied to the telephone line, the oscillator automatically functions to produce an oscillatory signal. The oscillatory signal can include a single frequency or can include multiple frequencies.

The frequency of the identification signal is determined by connecting either a resistor-capacitor series circuit, or a normally closed switch coupled to open when a pushbutton is depressed, across a portion of an inductive-capacitive tuned circuit to control the frequency of oscillation.

In a second embodiment of the invention, a standard rotary dial telephone of the prior art has been modified to include an oscillator circuit that operates in response to the high potential interrogation signal to produce the oscillatory identification signal.

DESCRIPTION OF THE PREFERRED EMBODIMENT

Figure 1:
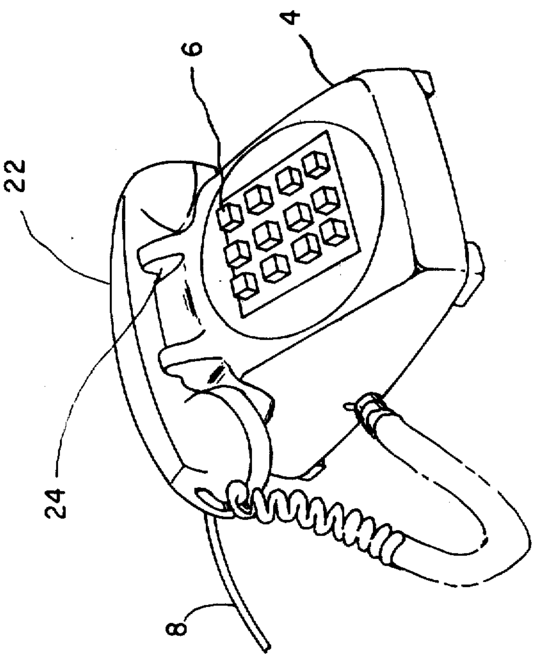
FIG. 1 is a perspective view of a telephone set including the pushbutton dial for multifrequency dialing.
Figure 3:
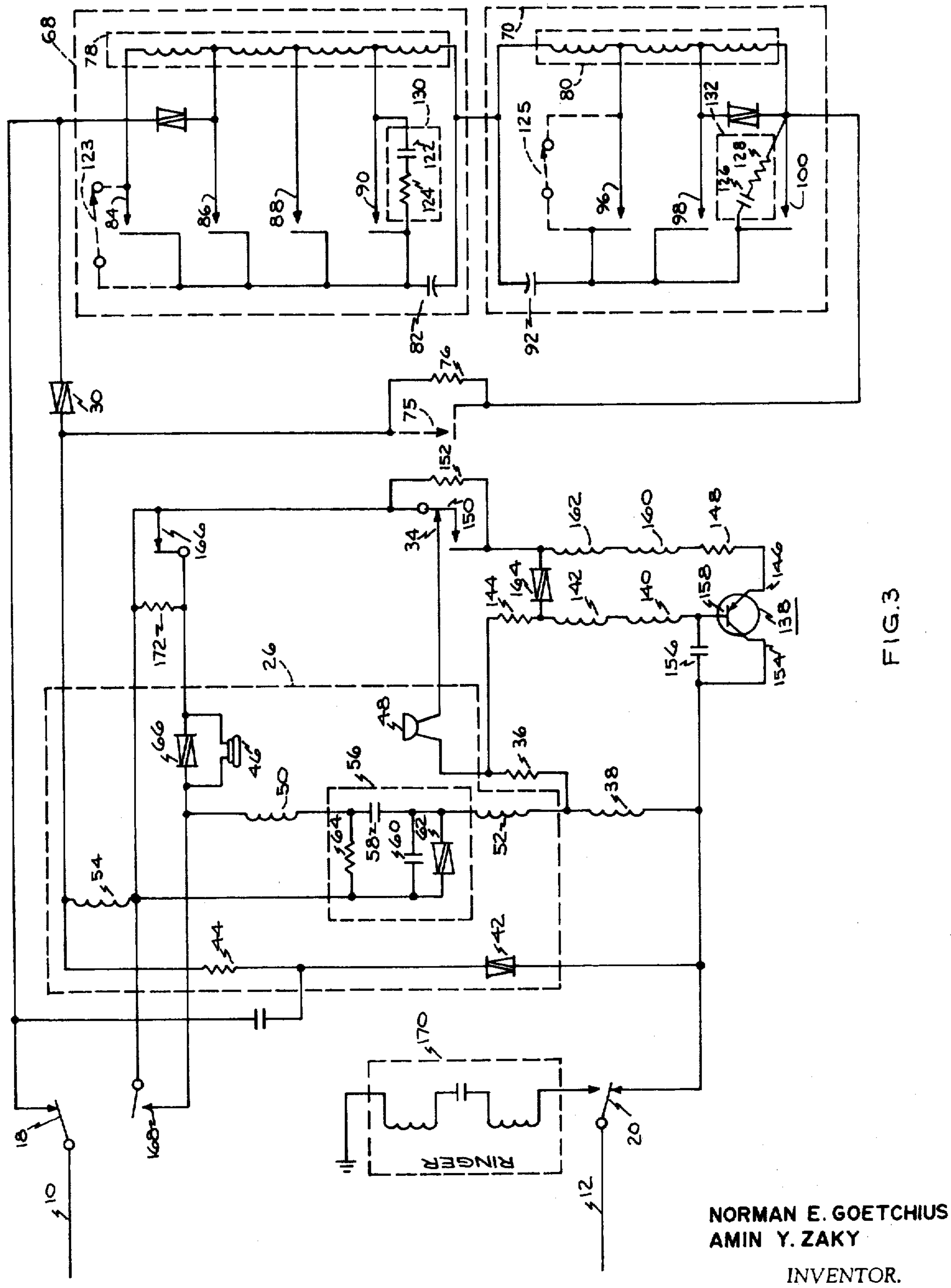
FIG. 3 includes an electrical circuit of the pushbutton telephone set of FIG. 1 modified to include the invention.
Figure 4:
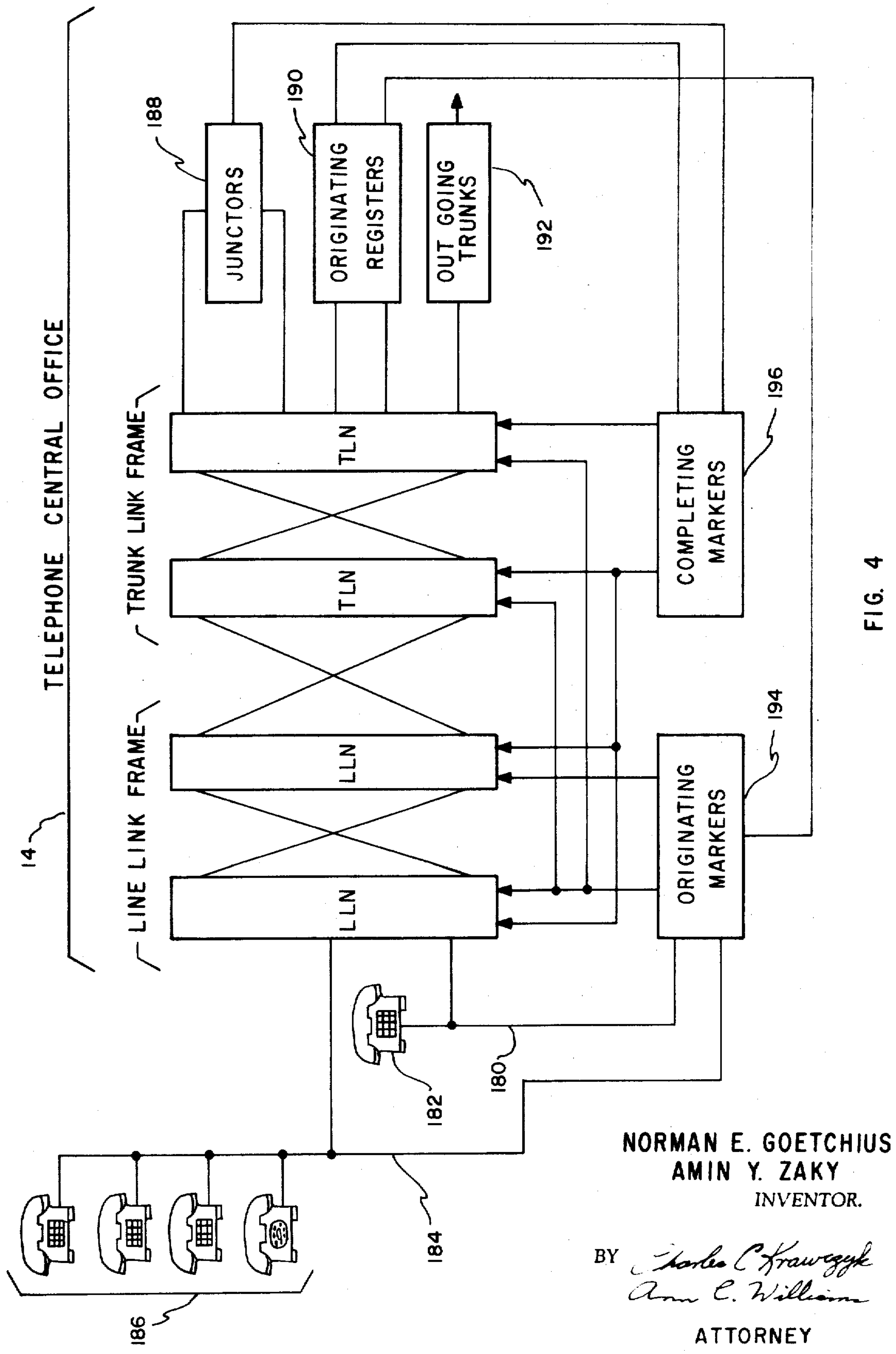
FIG. 4 is a block diagram of a telephone switching system with private and multiparty line telephone sets connected thereto and utilizing the identification system of the invention.

The telephone set of FIG. 1 includes a pushbutton dial 6 and is adapted to be connected by a cable 8 to a telephone central office 14 of the type illustrated in FIG. 4. The contacts illustrated in the electrical circuit of the telephone sets in FIGS. 3 and 6 correspond to the off hook condition. In the electrical circuit of FIG. 3, the telephone set is connected to the tip and ring lines 10 and 12 via the hookswitch contacts 18 and 20. When in the off hook condition, the hookswitch contacts 18 and 20 connect the speech circuit 26 (which is of the conventional antisidetone type) to the tip and ring lines 10 and 12. The speech circuit 26 includes a receiver 46, a transmitter 48, induction coils 50 and 52, and a line impedance balancing network 56 including capacitors 58 and 60, a varactor 62 and a resistor 64. The speech circuit 26 also has a varactor 66 connected across the receiver 46 as a noise suppressor, and a shunt impedance branch including a resistor 44 and a varactor 42 for telephone loop length compensation. One side of the transmitter 48 is connected via switch contacts 34, an inductor 54, and a varactor 30 to the hookswitch contacts 18. The other side of the transmitter 48 is connected through resistor 36 and an inductor 38 to the hookswitch contacts 20. One end receiver 46 is connected to one end of the line impedance balancing network 56 through the inductor 50 and the other end is connected to the hookswitch contacts 18 via switch 166 and parallel resistor 172, the inductor 54 and varactor 30. The telephone speech circuit 26 is a conventional well know circuit and does not need any further explanation.

The pushbutton dialing apparatus of the telephone set of FIG. 1 is controlled by the subscriber and is intended to allow the rapid transmission of multifrequency dialing information to the central office. The subscriber, by depression of any of the several pushbuttons 6 produces switching operations that energize the multifrequency signal generating circuit to produce oscillatory signals that include two frequencies determined by the pushbutton selected. The operation of a pushbutton switching arrangement and multifrequency signal generator is fully described in U.S. Pat. No. 3,184,554, issued to L.A. Meacham, et al., entitled "Subscriber Calling Apparatus".

Figure 2:
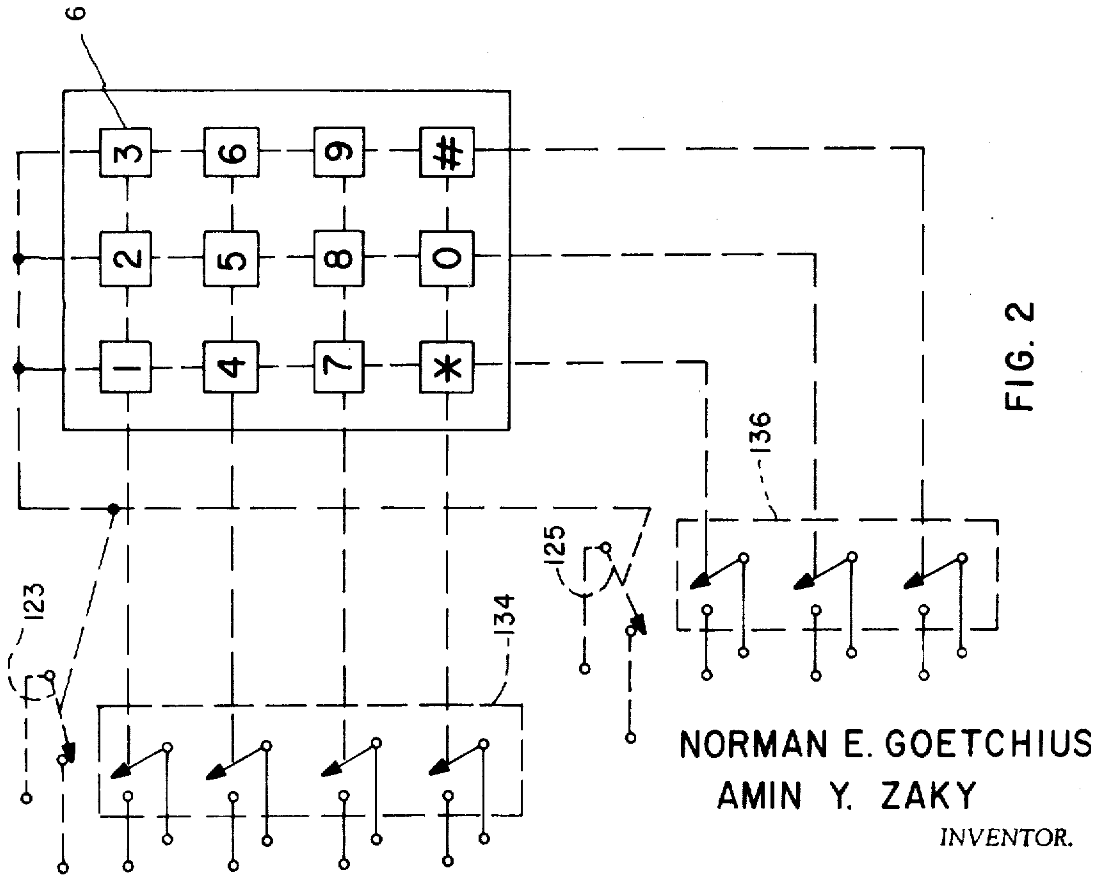
FIG. 2 illustrates the matrix switching arrangement of the pushbutton dial of FIG. 1.

The multifrequency dial signal generating circuit comprises a transistor oscillator circuit including a pair of series connected tuned or resonant inductor capacitor (L-C) circuits 68 and 70. The series L-C circuits 68 and 70 are shunted by a series circuit including the varactor 30 and a resistor 76. The first resonant circuit 68 includes a tapped coil 78 connected to one end of a capacitor 82. The other end of the capacitor 82 is connected to the tap switches 84–90 (mechanically coupled to the telephone dial pushbuttons 6) for connection of the capacitor across various taps on the coil 78. The second resonant circuit 70 includes a tapped coil 80 connected at an end to a capacitor 92. The other end of the capacitor 92 is connected to the tap switches 96–100 (also mechanically coupled to the telephone dial pushbuttons 6) for connection of the capacitor 92 across various taps of the coil 80. The pushbuttons 6 are mechanically coupled to actuate the tap switches 134 (corresponding to switches 84–90) and 136 (corresponding to switches 96–100) (FIG. 2) so that when any one of the pushbuttons is depressed, two switches are closed, one in group 84–90 and one in group 96–100, wherein the capacitors 82 and 92 are connected to corresponding taps on the coils 78 and 80, and establish the resonant frequencies of the multifrequency oscillator circuit during dialing.

According to the invention, a series resistor capacitor (R-C) circuit is connected to shunt any ones of the tap switches 84–90 and 96–100 to select a frequency or frequencies of the identification signal that corresponds to the shunted tap switches. For example, an R-C circuit 130, including a capacitor 122 and resistor 124, is connected across the tap switch 90 in the L-C circuit 68 selecting one frequency. A series R-C circuit 132, including a capacitor 126 and a resistor 128, is connected across tap switch 100 in the L-C circuit 70 selecting another frequency. The values of the resistors 124 and 128 and capacitors 122 and 126 are selected so that when a high level interrogation signal according to the invention is applied to the tip and ring lines 10 and 12, the R-C circuits 130 and 132 function to complete a circuit across the selected tap switches.

As an alternative, a pair of normally closed switches 123 and 125 (illustrated in phantom in FIGS. 2 and 3) are used to select the frequency of the identification signal. The switches 123 and 125 are illustrated as connected across the tap switches 84 and 96 in each of the L-C circuits 68 and 70, respectively, and select the frequencies corresponding to the tap switches 84 and 90. The switches 123 and 125 are mechanically coupled to the pushbutton 6 so that the switches 123 and 125 are opened when any of the pushbuttons are depressed. Furthermore, the switches 123 and 125 are coupled to the pushbutton 6 so that the switches 123 and 125 open before any of the tap switches 84–90 and 96–100 close and therefore do not interfere with dialing.

In addition, a resistor 76 replaces a switch 75 (shown in phantom in FIG. 3). In the usual multifrequency telephone, the switch 75 is opened only during dialing. Between dial pulses the switch 75 allows energy derived from the voltage across diode 30 to be stored in the coils 78 and 80 of the L-C circuits 68 and 70 so that the multifrequency generator can more rapidly respond to the closure of a depressed pushbutton. The resistor 76, according to the invention, allows the coils 78 and 80 to store energy between dial pulses and also effectively functions as a sufficiently high impedance to allow the multifrequency generator in the telephone set to respond to the high level interrogation signal. Further, the resistance of the resistor 76 is sufficiently high to allow the transistor oscillator to perform the usual oscillator functions upon depression of a pushbutton. The circuit, including the resistor 76, can be deleted, but the response of the oscillator to a depressed pushbutton will be slower.

The resonant circuits or tuned circuits 68 and 70 are inductively coupled to the coils 140, 142, 160 and 162 to form a portion of a transistor oscillator circuit. The active element of the oscillator circuit is a transistor 138 having its base connected through coils 140, 142 and 38, and resistances 144 and 36 to the hookswitch contacts 20. The collector 154 is connected directly to the hookswitch contacts 20. A capacitor 156 is connected between the base 158 and collector 154. The emitter 146 is connected to the switch contacts 150 via a resistor 148 and inductors 160 and 162. The switch 150, when closed (during dialing), connects the emitter circuit to line 10 via hookswitch contacts 18 while the base electrode 158 and the collector electrode 154 are connected to the line 12 via hookswitch contacts 20. Thus, the battery potential applied to the telephone lines 10 and 12 provides the energization potential for the transistor 138. The emitter circuit windings 160 and 162 are shunted by a diode 164 which serves to regulate the amplitudes of the voltages across the emitter windings.

In accordance with the present invention, a resistor 152 shunts the switch contacts 150. The contacts 150 are closed during dialing to complete the connection of the transistor 138 to the line circuit. The value of the resistor 152 is sufficiently large so that the transistor oscillator circuit does not oscillate when normal telephone voltages are applied to the telephone set, (except during dialing) but when a substantially higher then normal voltage (the interrogation signal) is applied across the lines 10 and 20, the resistor 152 provides sufficient current flow to enable the oscillator.

The value of the resistor 152 is selected so that: 1) when the normally operating potential (48 volts) is applied to the telephone line at the central office, the potential across the emitter 146 and collector 154 of the transistor 138 is substantially less than 0.7 volts, and 2) when the interrogation signal (substantially greater than 48 volts) is applied to the telephone lines at the central office, the voltage across the emitter 146 and the collector 154 of the transistor 138 is preferably between the range of 1.2 to 1.4 volts. The value of the resistor 152 will therefore be a function of the resistance of the central office circuit, the length of the telephone line and the load impedance of the telephone set.

When the telephone subset is in the on hook condition, the switch 18 is open, the switch 166 is closed, the switch 168 is closed, and the switch 20 is connected to the ringer circuit 170, and the speech circuit 26 and dialing mechanism 6 of the telephone set are electrically disconnected from the telephone lines 10 and 12. When the telephone set is in the off hook condition, the switches 18 and 20 connect the electrical circuit of the telephone set to the lines 10 and 12. When there is no dialing taking place, the switch 168 is open, the switch 166 is closed, the switch 150 is open and the switch 34 is closed. Upon operation of any one of the dial pushbuttons 6, the switch 150 is closed to connect the transistor oscillator circuit across the telephone lines 10 and 12, the switch 34 is opened to remove the transmitter from connection across the telephone lines, and the switch 166 is opened to allow only weak dialing signals to pass through the resistance 172 and the receiver 46. In addition, one tap switch 84–90 and 96–100 in each of the L-C circuits 68 and 70 is closed to select the resonant frequencies corresponding to the dialing digit associated with the depressed pushbutton.

In accordance with the identification system of the invention, the multifrequency oscillator circuit of the telephone circuit has been modified to include either an R-C circuit, or a normally closed switch, across a selected tap switch (of the tap switches 84–90 and 96–100) in one, or both, of the L-C circuits 68 and 70. Since each tap switch corresponds to a different resonant frequency, each subset can be made to include one or more resistance capacitance shunt circuits, or normally closed switch, providing various combinations of identification frequencies. The resistors 152 and 76 function to allow the oscillator to be operated by the application of a high level interrogation potential across the lines 10 and 12 and prevent the operation of the oscillator with the normal range of battery potential across lines 10 and 12, except during dialing.

The identification of the invention is described herein as connected to well known No. 5 Crossbar switching systems (FIGS. 4 and 5), such as that described in the U.S. Pat. No. 2,585,904, issued to A.J. Busch, entitled "Crossbar Telephone System", however, it is to be understood that other types of switching systems can be arranged to provide the same functions. The No. 5 Crossbar switching system includes a switching network having a line link frame (LLN) interconnected by links to a trunk link frame (TLN). A private subscriber line 180 and telephone set 182, and a multiparty subscriber line 184 with a plurality of telephone sets 186, are connected into the LLN. A plurality of interoffice junctors 188, a plurality of originating registers 190 and a plurality of outgoing trunks 192 are connected into the TLN. Originating markers 194 and completing markers 196 are each connected to the LLN, the TLN and the originating registers 190. In addition, the completing markers 196 are connected to the junctors 188 and the originating markers 194 are connected to the line circuits 180 and 184.

In operation, when a telephone set 182 or 186 goes off hook, the originating marker 194 identifies the line circuit and determines the class of service of the line. The originating marker 194 seizes a free originating register 190 and transmits the class of service of the calling line to the originating register and connects a free path through the LLN and TLN to a free originating register 190. The originating register 190 provides a battery potential (in the order of 48 volts) and dial tone through the seized path to the telephone line 184. In the case of pay telephones, the originating register also provides a high potential for coin return (in the order of 130 volts). Dial pulses from the telephones 182 and 186 are received by the originating register 190 and the information in the originating register 190 is translated into equipment identification signals which are transmitted to a completing marker circuit. The completing marker 196 seizes a free interoffice junctor 188 (or in the case of an outgoing circuit, an outgoing trunk 192) and completes the connection between the calling party and the called party. Once the connection is completed, the markers and the originating register are released and the call is maintained through the established connection.

Figure 5:
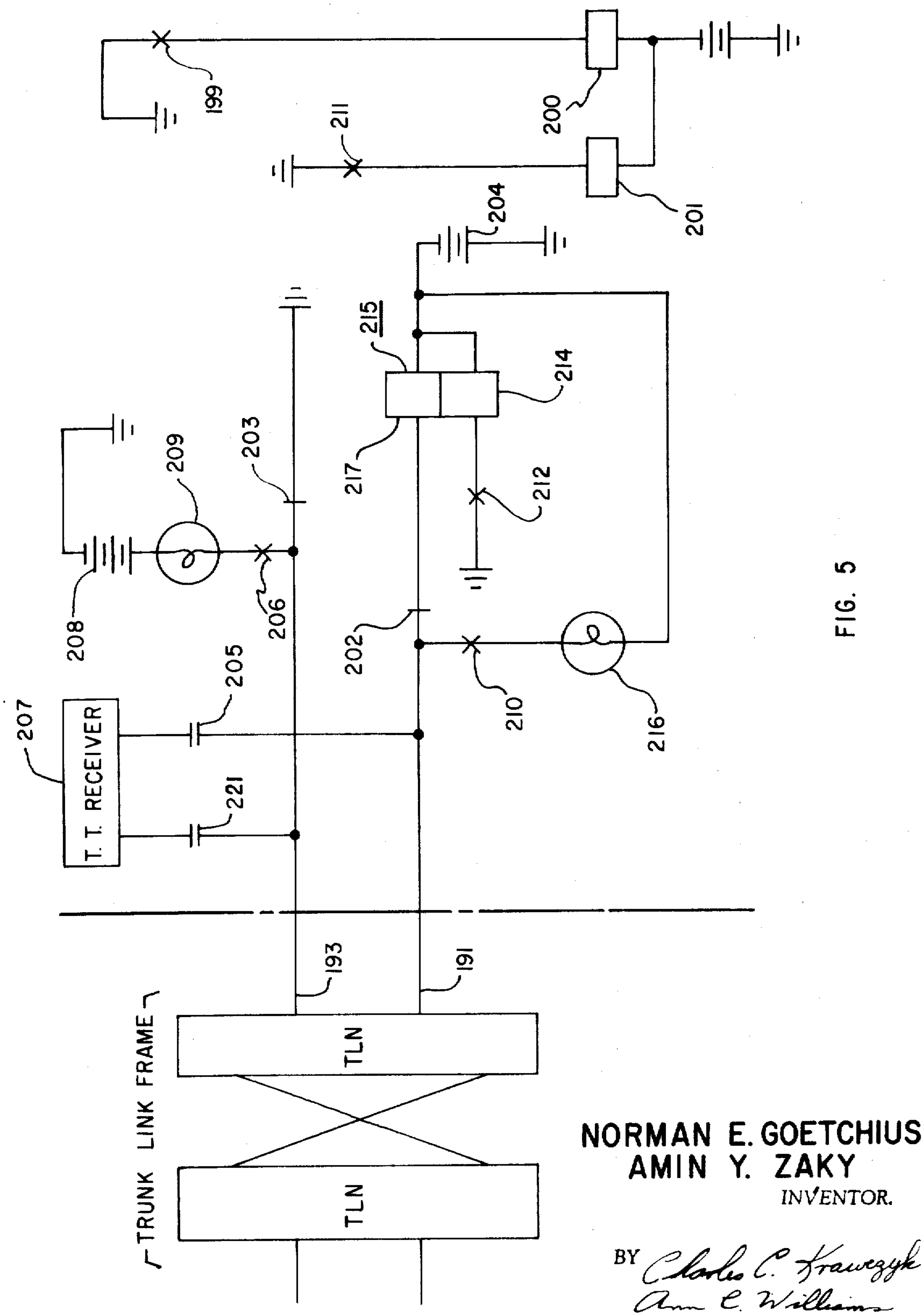
FIG. 5 is a schematic diagram of a switching circuit in the originating registers of the telephone system of FIG. 4 for applying an identification request signal to any of the telephone lines connected thereto.

When the switching system of FIG. 4 to be used as a portion of the party identification system of the invention, the additional high level potential source 208, such as that used for coin return, is included in the originating registers 190 (FIG. 5). The high level potential source 208 is used in conjunction with the normal central office battery 204 for sending identification interrogation signals from the central office to the connected telephone line when the class of service indicates the calling party includes the identification circuit of the invention. When the connection between a telephone set and the originating register is complete, the coil 217 of the relay 215 is energized, and the normal battery potential from the battery 204 (48 volts) is applied to the lines 191 and 193 via the relay coil 217 and the normally closed contacts 202 and 203.

When the originating marker 194 (FIG. 4) detects that the calling party includes the identification circuit of the invention, the originating marker 194 closes the contacts 199 (FIG. 5) and actuates the class relay 200. When the class relay 200 is energized, its contacts 211 complete the circuit for the identification request relay 201. When the relay 201 is energized, its relay contacts 202 and 203 open, and its contacts 206, 210 and 212 close. When contacts 202 open and the contacts 210 close, the relay coil 217 is bypassed by a ballast lamp 216. When the contacts 203 open and the contacts 206 close, ground is removed from line 193 and a high potential from the battery 208 (130 volts) is applied to the line 193 via the ballast lamp 209. The relay 215 is maintained actuated during the identification sequence by the contacts 212 which complete the circuit for coil 214. The two batteries 204 and 208 are now connected in series to apply approximately 178 volts across the lines 191 and 193.

When the 178 volt interrogation signal is applied to the lines 193 and 191, the oscillator circuit in the "off hook" telephone set responds to the interrogation signal. The addition of the R-C circuits 130 and 132 (or the normally closed switches 123 and 125) and the resistors 152 and 76 to the oscillator circuit allows the oscillator circuit to respond to the 178 volt interrogation signal to generate a multifrequency identification signal of substantially the same frequency as if a pair of the tap switches (tap switches 90 and 100 in FIG. 3) and the switch 150 were closed (or in the case of switches 123 and 125, as if the tap switches 89 and 96 were closed). The identification signals from the telephone sets are transmitted over the telephone line to the central office and through the LLN and TLN and capacitors 221 and 205 to multifrequency receiver 207. A suitable multifrequency receiver described in U.S. Pat. No. 3,140,357 issued to W. Bischof, et al., entitled "Multifrequency Receiver" can be used to detect the particular frequencies transmitted and provides a signal for identifying the particular party. After identification is complete, the contacts 199 open, to deactivate the relays 200 and 201, the battery 208 is disconnected and the battery 204 is reconnected to the lines 191 and 193 via relay coil 217. With the normal line potential (48 volts) applied to the line, the resistor 152 maintains the oscillator circuit non-oscillatory unless a dial pushbutton is depressed.

The 178 volt potential is used here for purposes of illustrating the invention. It is to be understood any increased line potential can be used to obtain party identification signals provided the level of the voltage for party identification is substantially higher than the normal telephone operating voltage so that it provides sufficient amplitude of interrogation signal to activate the identification circuitry of the telephone set as described above. As the ratio between the interrogation potential and the normal battery voltage increases, the range of values available for the resistor 152 increases, and the tolerance in the value of the resistor 152 increases.

Figure 6:
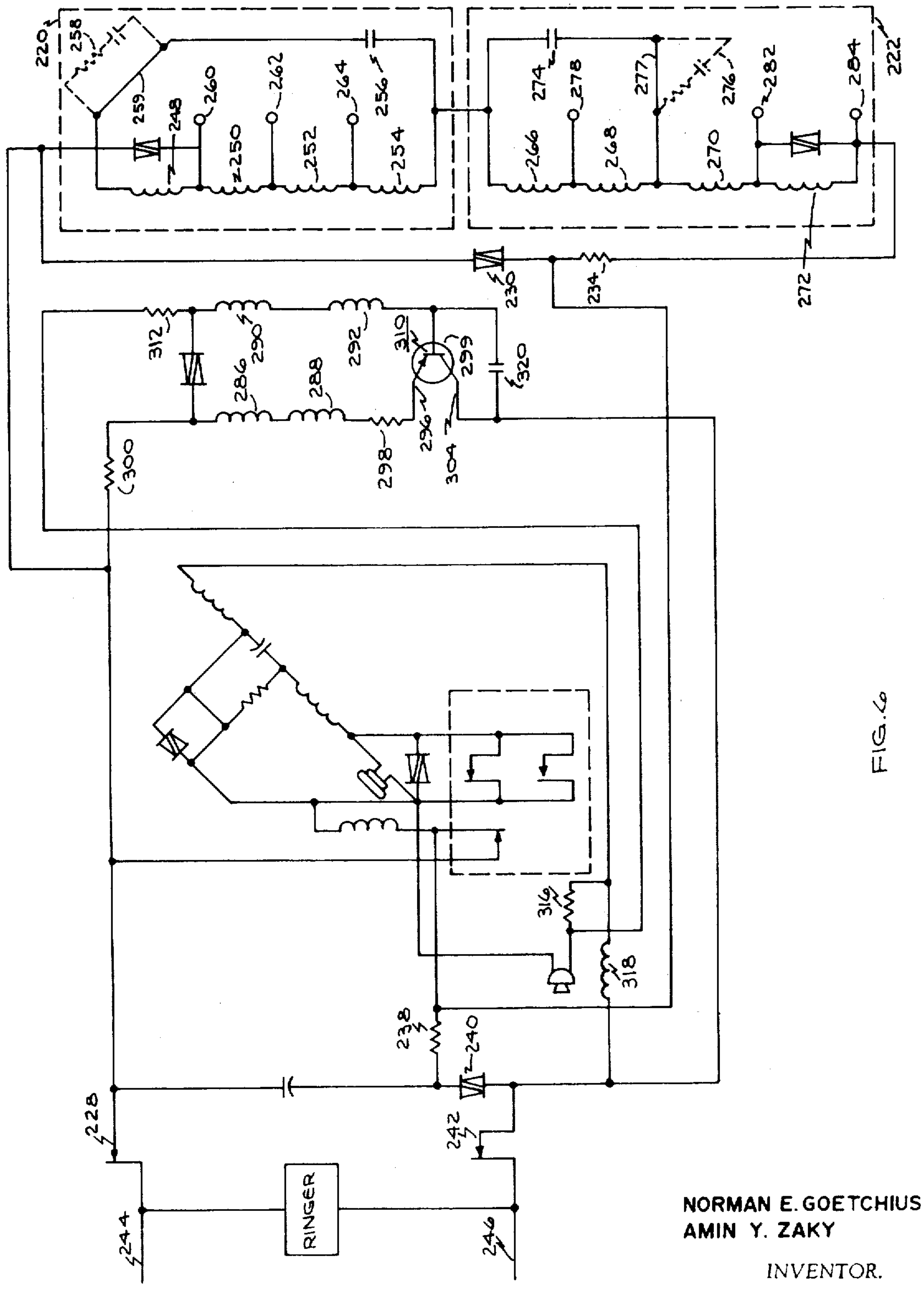
FIG. 6 shows the electrical circuit of a rotary dial telephone set including the invention.

Another embodiment of the invention is shown in FIG. 6. This embodiment utilizes a standard rotary dial telephone set circuit, such as is described in an article entitled "An Improved Circuit for the Telephone Set" by A.F. Bennett on pages 611 to 626 in "The Bell System Technical Journal", dated May 1953, modified to include a multifrequency signal generating circuit. The transmitter, receiver, dialing, etc. circuitry in FIG. 6 are well known and do not require any detailed explanation. In this second embodiment of the invention, a pair of tuned circuits 220 and 222 and a transistor oscillator of the type described above with regards to FIG. 3 are connected in the telephone circuit. One end of the series connected tuned circuits 220 and 222 is connected to the hookswitch contacts 228. A series circuit, including the varactor 230 and a resistor 234 is connected across the tuned circuits 220 and 222. The junction of the varactor 230 and the resistor 234 is connected through the resistor 238 and varactor 240 to the hookswitch contacts 242.

The tuned circuit 220 includes the usual series inductors 248, 250, 252 and 254 and a capacitor 256. The tuned circuit is completed by a direct connection 259, or a series R-C circuit 258 (shown in phantom) of the type described above (such as element 130 of FIG. 3) connected between the capacitor 256 and the inductor 248. This direct connection 259, or R-C circuit 258, can be inserted between the capacitor 256 and any of the other inductor taps 260, 262 or 264 to select any of the other resonant frequencies available. Similarly, the tuned circuit 222 includes the usual inductors 266, 268, 270 and 272 and a capacitor 274. The tuned circuit is completed by a direct connection 277, or series R-C circuit 276, (shown in phantom) connected between the capacitor 274 and the tap 280 between inductors 268 and 270. This direct connection 277, or R-C circuit 276, can be inserted between the capacitor 274 and any of the taps 278, 280, 282 or 284 to select different resonant frequencies. It is to be understood, if desired, more taps can be placed on the coils to provide a larger selection of frequencies. Thus, a large number of party identification frequency combinations can be obtained.

The tuned circuits 220 and 222 are inductively coupled to the coils 286, 288, 290 and 292, which, in turn, form a portion of a transistor oscillator circuit. An emitter 296 of a transistor 294 is connected through a resistor 298, coils 288 and 286 and a resistor 300 to the hookswitch contacts 228. The collector 304 is directly connected to the hookswitch contacts 242. The base 310 is connected through coils 292 and 290, resistor 312, a resistor 316, and an inductor 318 to the hookswitch contacts 242. The base 310 is also connected through a capacitor 320 to the collector 304.

The telephone set of this second embodiment is connected into a central office of FIG. 5 in the same manner as previously described in connection with the pushbutton telephone set of FIG. 3. The value of the resistor 300 is selected so that substantially less than 0.7 volts is applied across the emitter 296 and collector 304 of the transistor 294 when the normal range of line potential (48 volts) is applied across the line circuit and when the substantially higher potential interrogation signal is applied to the lines 244 and 246, a potential between 1.2 to 1.4 volts is developed across the emitter 296 and collector 304. Hence, with this arrangement, the oscillator circuit will not operate with normal battery potential applied to the line. However, with the interrogation potential present, a sufficient potential will be applied to the oscillator circuit to energize the circuit to produce the identification signal to generate the oscillatory identification signal.

In accordance with the present invention, the multifrequency oscillator circuits in the standard multifrequency pushbutton telephone sets are modified to be responsive to an interrogation signal from the central office to generate an oscillatory signal having a particular identification frequency assigned thereto. In the event of rotary dial-type telephones, the standard multifrequency oscillator circuit that is modified in accordance with the invention is added to the telephone set to provide means for generating oscillatory signals in response to the interrogation signal. The oscillator tuned circuits can be modified to include a single normally closed switch (FIG. 3), or R-C circuit (FIGS. 3 and 6), or a single direct connection (FIG. 6) to select a single frequency identification signal, or modified to include a plurality of switches (FIG. 3) or a plurality of R-C circuits (FIGS. 3 and 6) or a plurality of direct connections (FIG. 6) to provide a multifrequency identification signal. In the event that the identification system of the invention is used for identifying particular telephone sets on a multiparty line, each party will be given a unique frequency or combination of frequencies so that each party can be individually identified. The identification system of the present invention can be installed in existing multifrequency pushbutton telephone sets by only making small changes to the well known readily available electrical circuitry. The various parties assigned to a multiparty line can be assigned the combination of frequencies corresponding to any one of the ten dialing digits thereby providing for the separate identification of any one of ten parties on the line, and also allows for the use of standard multifrequency detecting equipment in the central office for identifying the separate parties. However, if a large number of separate lines, and/or a larger number of multiparty connections are made to a single line, any combination of frequencies can be employed to identify the individual telephone sets.

The identification system of the invention has an advantage wherein an identification signal can be automatically provided in response to an interrogation signal from the central office immediately after a telephone set goes off hook. There is no need for any added physical activity on the part of the subscriber, such as dialing extra digits, or oral identification to the operator. Furthermore, the telephone set is identified prior to dialing, and therefore there are no added signals required to be transmitted along with the multifrequency dial signals as done in the prior art. In addition to the foregoing, if one of the multiparty telephone sets is inadvertently left off hook for an extended period of time, the operator need merely transmit the interrogation signal to the line and will automatically receive the oscillatory identification signal that will identify the particular telephone set that is off hook.

While exemplary embodiments of the invention have been shown and described, it will be appreciated that variations and modifications thereof within the spirit and scope of the invention will undoubtedly suggest themselves to those skilled in the art. Accordingly, the foregoing description should be taken merely as illustrative and not in any limiting sense.

What is claimed is:

1. A party telephone identification system comprising:
- a central office including a high potential source having a value substantially greater than the central office battery potential;
- a multiparty subscriber's line connected into said central office;
- a plurality of telephone sets connected to said line, each said set having on hook and off hook conditions;
- circuit means in said central office for connecting said high potential source to said line, and
- electrical signal generating means connected in each of said sets, so that when a set is in the off hook condition and said central office potential source is connected to said line, said signal generating means generates and transmits an identification oscillatory signal unique to said off hook set to the central office.

2. A party identification system as set forth in claim 1 wherein:
- said electrical signal generating means includes at least one inductance, resistance, capacitance tuned circuit, the arrangement being such that said tuned circuit selects the resonant frequency when said high potential signal is connected to said telephone line.

3. In a telephone system, a telephone set, a line connecting said telephone set to a central office, circuit means in said central office for applying to said telephone line a D.C. potential which is substantially greater than the central office battery potential, and means in said telephone set responsive to said D.C. potential when the telephone set is in the off hook condition for transmitting an oscillatory identification signal to said central office.

4. A telephone system as defined in claim 3 wherein said means in said telephone set includes an oscillator circuit connected to the telephone line via the telephone set hookswitch contacts and said oscillator circuit oscillates in response to said D.C. potential.

5. A telephone system as defined in claim 4 wherein said means in said telephone set includes a multifrequency oscillator circuit coupled to a pushbutton dial to provide multifrequency dial signals and circuit means coupled to said oscillator circuit for rendering the oscillator responsive to said D.C. potential.

6. A telephone system as defined in claim 4 wherein said oscillator circuit generates a plurality of frequencies during the presence of said D.C. potential.

7. In a telephone subset including a multifrequency oscillator circuit having a pair of tuned inductance-capacitance circuits with a plurality of switches for connecting the capacitance to various portions of the inductance to control the frequency of oscillation, switching means for connecting the oscillator circuit to the telephone line via the telephone hookswitch contacts, and a pushbutton dial connected to the switching means and the plurality of switches for connecting the oscillator circuit to said hookswitch contacts and closing a switch in each of the tuned circuits each time a pushbutton is depressed, the improvement comprising:

circuit means connected to shunt one of the plurality of switches in at least one of said tuned circuits, and resistor means connected across said switching means so that said oscillator circuit is enabled to oscillate at the frequency corresponding to the tuned circuit having the shunt circuit means when the telephone hookswitch is in the off hook condition and a high potential is applied across the telephone line that is substantially greater than 48 volts.

8. In a telephone subset as defined in claim 7 wherein:

separate circuit means is connected to shunt one of the plurality of switches in each of said tuned circuits so that the oscillator circuit when energized by said high potential generates the frequencies corresponding to the dial frequencies of the two switches shunted.

9. In a telephone subset as defined in claim 8 wherein:

said separate circuit means comprises a series resistor and capacitor circuit.

10. In a telephone subset as defined in claim 8 wherein:

both of said separate circuit means comprises a normally closed switch that is coupled to said pushbutton dial to be opened each time a pushbutton is depressed, and wherein the normally closed switches open before any of said plurality of switches close.

11. In a rotary dial type telephone, the improvement comprising:

a pair of terminals for connection to a telephone exchange;

a hookswitch having off hook and on hook conditions connected to said pair of terminals;

an oscillator circuit;

a tuned circuit including an inductor and a capacitor, inductively coupled to said oscillator circuit for determining the frequency of oscillation, and resistive means coupling said oscillator circuit to said hookswitch so that when said hookswitch is on the off hook condition and a potential substantially greater than 48 volts is applied across said pair of terminals, said oscillator circuit is energized by said potential to break into oscillation and apply the oscillation signals to said pair of terminals.

* * * * *